United States Patent Office 3,317,390
Patented May 2, 1967

3,317,390
COMPOSITIONS HAVING CNS DEPRESSANT ACTIVITY
Corris Mabelle Hofmann, Ho-Ho-Kus, and Sidney Robert Safir, River Edge, N.J., assignors to American Cyanamid Company, Stamford, Conn., a corporation of Maine
No Drawing. Filed July 27, 1965, Ser. No. 475,233
5 Claims. (Cl. 167—65)

This invention relates to new compositions of matter. More particularly, it relates to compositions containing as an active component substituted 5-phenylpyrrolidine-2,4-diones and methods of administering said compositions.

The physiologically active components of the present compositions may be illustrated by the following formula:

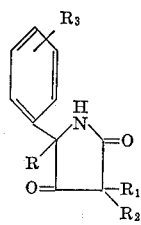

wherein R and $R_1$ are lower alkyl and $R_2$ and $R_3$ are selected from the group consisting of hydrogen and lower alkyl.

The active components of the compositions of this invention are white crystalline solids, soluble in organic solvents, such as acetone and alcohol, and insoluble in water and dilute mineral acids. When $R_2$ is hydrogen the compounds are soluble in dilute alkali metal carbonates and hydroxides.

The active components of the compositions of this invention in which either $R_1$ or $R_2$ or both are lower alkyl may be prepared by reacting a 2-amino-2-phenyl(or lower alkylphenyl)alkanamide with an α-alkylacetoacetic ester in an inert solvent such as boiling toluene, xylene or mesitylene. The resulting 2-(α-alkylacetoacetamido)-2-phenyl(or lower alkylphenyl)alkanamide may be treated with an acid such as polyphosphoric or sulfuric acid at temperatures of 50°–100° C. for 15 minutes to 2 hours or so, followed by treatment with an alcohol such as methanol or ethanol, to give the corresponding 2-(α-alkylacetoacetamido)-2-phenyl-(or lower alkylphenyl)-alkanoic esters. These are cyclized with an aqueous alkali metal hydroxide or an alcoholic alkali metal alkoxide at temperatures of 50°–100° C. The resulting 3,5-substituted-5-phenyl-(or lower alkylphenyl)-pyrrolidine-2,4-diones may be further alkylated with lower alkyl halides, such as methyl iodide, ethyl bromide or the like, in a suitable solvent, as, for example, ethanol, in the presence of an alkali metal alkoxide, as for example, sodium methoxide at temperatures of 25°–80° C. In the case where $R_1$ is lower alkyl and the lower alkyl halide is ethyl iodide a small amount of O-ethylated product is obtained also.

This series of reactions is illustrated schematically below:

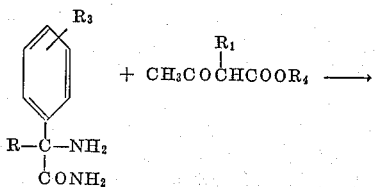

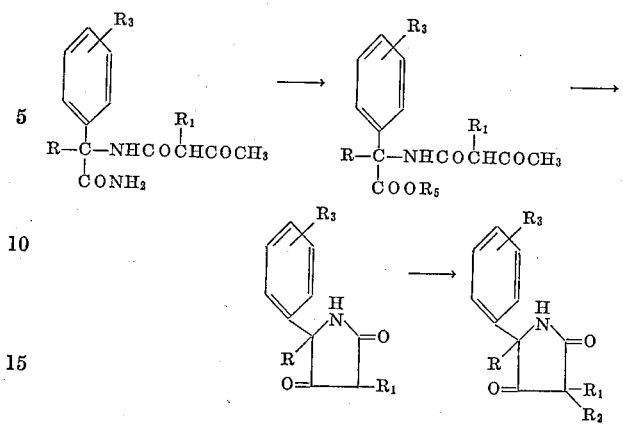

wherein $R_2$ and $R_3$ are hydrogen or lower alkyl, and R, $R_1$, $R_4$ and $R_5$ are lower alkyl.

The compounds of this invention in which $R_1$ and $R_2$ are both hydrogen may be prepared by two methods. In method A a 2-amino-2-phenyl-(or lower alkylphenyl)-alkanamide is reacted with an acetoacetic ester in the manner indicated above for the α-alkylacetoacetic esters, and the resulting 2-acetoacetamido-2-phenyl-(or lower alkylphenyl)-alkanamides are converted into the corresponding 2-acetoacetamido-2-phenyl-(or lower alkylphenyl) alkanoic esters also described above. Treatment of these esters with aqueous alkali metal hydroxides or alcoholic alkali metal alkoxides in the manner described above, gives the 3-acetyl-5-substituted-5-phenyl-(or lower alkylphenyl)-pyrrolidine-2,4-diones which may then be hydrolyzed with a mineral acid to give the compounds of this invention in which $R_1$ and $R_2$ are hydrogen.

The above reactions are illustrated schematically below:

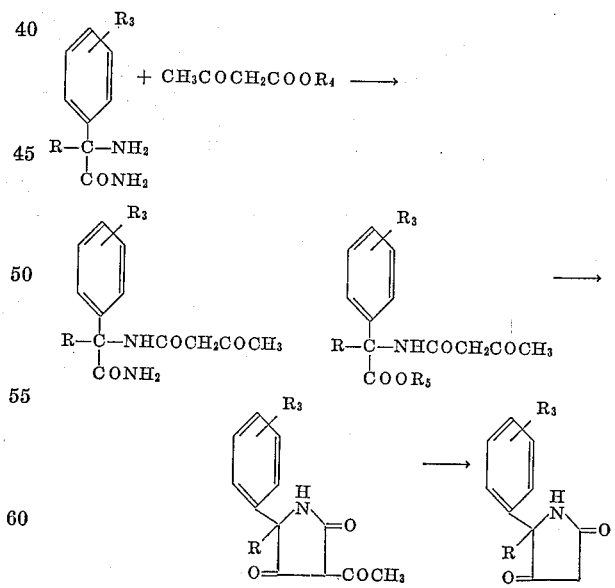

wherein $R_3$ is hydrogen or lower alkyl, and R, $R_4$ and $R_5$ are lower alkyl.

In method B a 2-amino-2-phenyl-(or lower alkylphenyl)-alkanamide is reacted with acetyl chloride in an inert solvent such as ether, acetone or benzene in the presence of a base, as for example, triethylamine, or with acetic anhydride in acetic acid to give a 2-acetamido-2-phenyl-(or lower alkylphenyl)-alkanamide. The latter is treated with polyphosphoric acid or sulfuric acid at temperatures of 50°–100° C. followed by treatment with an alcohol such as methanol or ethanol to give the corresponding 2-acetamido-2-phenyl-(or lower alkylphenyl)-alkanoic ester. These esters are cyclized with a strong base such as an alkali metal hydride, for example, sodium hydride in a refluxing solvent such as toluene to give the compounds of this invention in which $R_1$ and $R_2$ are hydrogen. These reactions are illustrated below:

METHOD B

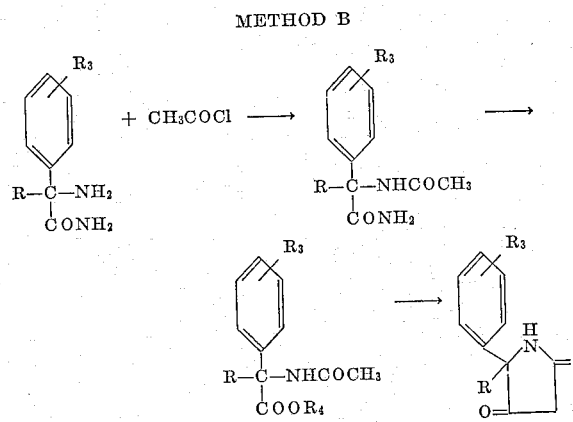

wherein $R_3$ is hydrogen or lower alkyl and R and $R_4$ are lower alkyl.

When the compounds of this invention in which $R_1$ and $R_2$ are hydrogen and R is lower alkyl and $R_3$ is hydrogen or lower alkyl are treated with methyl iodide and one equivalent of methanolic sodium methoxide, the resulting products are the 3-methyl-5-alkyl-5-phenyl-(or lower alkylphenyl)-pyrrolidine-2,4-diones. In a similar manner, treatment of the compounds of this invention in which $R_1$ and $R_2$ are hydrogen and R is lower alkyl with ethyl iodide and one equivalent of ethanolic sodium ethoxide gives predominately the 3-ethyl-5-lower alkyl-5-phenyl-(or lower alkylphenyl)-pyrrolidine-2,4-diones along with a small amount of the O-ethyl products, namely, 4-ethoxy-5-lower alkyl-5-phenyl-(or lower alkylphenyl)-pyrrolin-2-ones. When lower alkyl halides of more than two carbons are used the products formed are predominately the 4-lower alkoxy-5-lower alkyl-5-phenyl-(or lower alkylphenyl)-pyrrolin-2-ones.

These reactions are illustrated below:

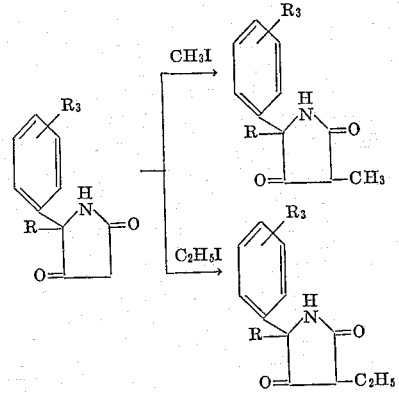

wherein R and $R_3$ are as hereinbefore defined.

The compounds of the present invention are physiologically active in warm-blooded animals as central nervous system depressants. They may be used as sedatives, hypnotics or tranquilizers. The dosage of the compounds of this invention will depend on the route of administration, age, weight, and condition of the warm-blooded animal. A total daily dose of from about 10 mg. to about 1000 mg. given singly or in divided dosage several times daily embraces the effective range of treatment of most conditions for which the compounds are useful.

The compounds of the present invention can be used in the form of compositions preferably administered in unit dosage form such as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage from affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include suitably flavored emulsions with edible oils, such as, cottonseed oil, sesame oil, coconut oil, peanut and the like, as well as elixirs and similar pharmaceutical vehicles. Suitable dispersing or suspending agents for aqueous suspensions include synthetic and natural gums, such as, tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosage for warm-blooded animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals as disclosed in detail in this specification, these being features of the present invention. Examples of suitable oral unit dosage forms in accord with this invention are tablets, capsules, pills, powder packets, granules, wafers, cachets, teaspoonfuls, dropperfuls, ampules, vials, segregated multiples of any of the foregoing, and other forms as herein described.

The present invention will be described in greater detail in the examples which follow which describe the preparation of the substituted-5-phenylpyrrolidine-2,4-diones and formulations containing the compounds.

EXAMPLE 1

*Preparation of 2-phenyl-2-(α-methylacetoacetamido) propionamide*

A solution of 65.7 g. of 2-amino-2-phenylpropionamide, and 63.4 g. of a α-methylacetoacetic ester in 560 ml. of mesitylene is refluxed for 2 hours during which time 330 ml. of mesitylene is removed by distillation. The reaction mixture is cooled and the mesitylene is decanted from the sticky solid. The solid is crystallized from ethanol and then washed with dilute hydrochloric acid to removed unreacted aminophenylpropionamide. The solid is recrystallized from ethanol or isopropyl alcohol to give 2 - phenyl - 2 - (α - methylacetoacetamido)propionamide, melting point 152°–155° C.

EXAMPLE 2

*Preparation of methyl 2-phenyl-2-(α-methylacetoacetamido)propionate*

A mixture of 5.2 g. of 2-phenyl-2-(α-methylacetoacetamido)propionamide and 50 g. of polyphosphoric acid is warmed on a steam bath for 1 hour and then the hot syrup is poured slowly into 100 ml. of cold methanol. The mixture is stirred until a clear solution is formed and then the excess methanol is removed by evaporation. To the resulting syrupy residue is added ice water whereupon the product precipitates. The solid product is recrystallized from methanol and from a mixture of chloroform and petroleum ether. Recrystallized methyl 2-phenyl-2-(α-methylacetoacetamido)propionate, melting point 123°–125° C. is obtained.

EXAMPLE 3

*Preparation of 3,5-dimethyl-5-phenylpyrrolidine-2,4-dione*

A solution of 1 g. of methyl 2-phenyl-2-(α-methylacetoacetamido)propionate in 7.2 ml. of 1 N methanolic sodium methoxide is refluxed for 30 minutes and then evaporated to dryness. Dilute hydrochloric acid is added to the residue and the mixture is filtered. The insoluble material is recrystallized from ethanol to give 3,5-dimethyl-5-phenylpyrrolidine-2,4-dione; melting point 185°–187° C.

EXAMPLE 4

*Preparation of 3,5-dimethyl-5-phenylpyrrolidine-2,4-dione*

One gram of methyl 2-phenyl-2-(α-methylacetoacetamido)propionate in 35 ml. of 1.5 N aqueous sodium hydroxide solution is warmed at 75°–100° C. until a clear solution is obtained. The solution is cooled and acidified with aqueous hydrochloric acid and the solid which separates is collected and recrystallized as described in Example 3 to give 3,5-dimethyl-5-phenylpyrrolidine-2,4-dione, melting point 185°–187° C.

EXAMPLE 5

*Preparation of 2-phenyl-2-(α-ethylacetoacetamido)propionamide*

When the procedure of Example 1 is repeated using α-ethylacetoacetic ester in place of α-methylacetoacetic ester 2-phenyl-2-(α-ethylacetoacetamido)propionamide is obtained, melting point 139°–140° C.

EXAMPLE 6

*Preparation of methyl 2-phenyl-2-(α-ethylacetoacetamido)propionate*

When the procedure of Example 2 is followed using 2-phenyl-2-(α-ethylacetoacetamido)propionamide in place of 2-phenyl-2-(α-methylacetoacetamido)propionamide methyl 2-phenyl-2-(α-ethylacetoacetamido)propionate having a melting point of 100°–102° C. is obtained.

EXAMPLE 7

*Preparation of 3-ethyl-5-phenyl-5-methylpyrrolidine-2,4-dione*

The procedure of Example 3 is repeated except that methyl 2-phenyl-2-(α-ethylacetoacetamido)-propionate is used in place of methyl 2-phenyl-2-(α-methylacetoacetamido)propionate. The 3-ethyl-5-phenyl-5-methyl-pyrrolidine-2,4-dione is obtained as a white solid, melting point 95°–99° C. (dec.).

EXAMPLE 8

*Preparation of 2-phenyl-2-(α-methylacetoacetamido)butyramide*

Following the procedure of Example 1 and using 71.2 g. of 2-amino-2-phenylbutyramide in place of 2-amino-2-phenylpropionamide, the product 2-phenyl-2-(α-methylacetoacetamido)butyramide, melting point 165°–166° C., is obtained.

EXAMPLE 9

*Preparation of methyl 2-phenyl-2-(α-methylacetoacetamido)butyrate*

The procedure of Example 2 is repeated except that 5.6 g. of 2-phenyl-2-(α-methylacetoacetamido)butyramide is used in place of 2-phenyl-2-(α-methylacetoacetamido)propionamide. Methyl 2-phenyl - 2 - (α-methylacetoacetamido)butyrate, melting point 95°–97° C., is obtained.

EXAMPLE 10

*Preparation of 5-ethyl-3-methyl-5-phenylpyrrolidine-2,4-dione*

A mixture of 4.7 g. of methyl 2-phenyl-2-(α-methylacetoacetamido)butyrate in 50 ml. of 1 N sodium hydroxide is warmed until a clear solution forms. The solution is cooled and acidified with hydrochloric acid, and the solid which separates is collected and recrystallized from ethanol to give 3.0 g. of 5-ethyl-3-methyl-5-phenylpyrrolidine-2,4-dione, melting point 179°–181° C. (dec.).

EXAMPLE 11

*Preparation of 2-phenyl-2-(α-ethylacetoacetamido)-butyramide*

The procedure of Example 1 is repeated except that 58.8 g. of 2-amino-2-phenylbutyramide, 52.2 g. of α-ethyl acetoacetic ester and 430 ml. of mesitylene are used. Compound 2-phenyl - 2 - (α-ethylacetoacetamido)butyramide, melting point 165–165.5° C. is obtained.

EXAMPLE 12

*Preparation of methyl 2-phenyl-2-(α-ethylacetoacetamido)butyrate*

The procedure of Example 2 is repeated except that 5.8 g. of 2-phenyl-2-(α-ethylacetoacetamido)butyramide is used in place of 2-phenyl-2-(α-methylacetoacetamido)-propionamide. Methyl 2-phenyl - 2 - (α-ethylacetoacetamido)butyrate is obtained as a white solid, melting point 83°–84° C. (dec.).

EXAMPLE 13

*Preparation of 3,5-diethyl-5-phenylpyrrolidine-2,4-dione*

The procedure in Example 4 is repeated except that 3 g. of 2-phenyl-2-(α-ethylacetoacetamido)butyrate in 55 ml. of 0.5 N sodium hydroxide is used . 3,5-diethyl-5-phenylpyrrolidine-2,4-dione, melting point 119°–121° C. (dec.) is obtained.

EXAMPLE 14

*Preparation of 3,5-dimethyl-3-methyl-5-phenylpyrrolidine-2,4-dione(β-isomer)*

A solution of 2 g. of 3-methyl-5-ethyl-5-phenylpyrrolidine-2,4-dione and 2 ml. of ethyl iodide in 10 ml. of 1 N ethanolic sodium ethoxide is refluxed for 2 hours and then evaporated to dryness. Water and a small amount of ethanol are added to the oily residue to cause crystallization. The solid is collected and dissolved in hot ethanol, and the solution is cooled and filtered to remove any O-ethyl material. The filtrate is then diluted with water to give the product as a solid which is recrystallized from dilute ethanol. Compound 3,5-diethyl-3-methyl-5- phenylpyrrolidine-2,4-dione (β-isomer), a white solid, melting point 105°–105.5° C., is obtained.

EXAMPLE 15

*Preparation of 3,5-diethyl-3-methyl-5-phenylpyrrolidine-2,4-dione (α-isomer)*

The procedure in Example 14 is repeated using 3,5-diethyl-5-phenylpyrrolidine-2,4-dione except that 3 ml. of methyl iodide is used in place of ethyl iodide. 3,5-diethyl-3-methyl-5-phenylpyrrolidine-2,4-dione (α-isomer) is obtained as a white crystalline solid melting point 115°–116° C. after recrystallization from aqueous ethanol.

EXAMPLE 16

*Preparation of 2-acetamido-2-phenylbutyramide*

To a solution of 45 g. of 2-amino-2-phenylbutyramide and 25 g. of triethylamine in 1250 ml. of acetone is added slowly 19.6 g. of acetyl chloride. The mixture is stirred for 3 hours and then filtered. The filtrate is evaporated and the solid residue is recrystallized from ethyl acetate to give 45 g. of 2-acetamido-2-phenylbutyramide as a white solid, melting point 175.5–176° C.

EXAMPLE 17

*Preparation of methyl 2-acetamido-2-phenylbutyrate*

The procedure of Example 2 is repeated except that an equivalent molar quantity of 2-acetamido-2-phenylbutyramide is used in place of 2-phenyl-2-(α-methylacetoacetamido)propionamide. Methyl 2-acetamido-2-phenylbutyrate is obtained as a solid, melting point 152.5–153.5° C.

EXAMPLE 18

*Preparation of 5-ethyl-5-phenylpyrrolidine-2,4-dione*

A solution of 23.5 g. of methyl 2-acetamido-2-phenylbutyrate in 125 ml. of sodium-dried toluene is treated with 9.7 g. of 52% sodium hydride dispersed in oil and the resulting mixture is stirred and refluxed for 4 hours. The mixture is cooled and treated first with 125 ml. of water and then with 80 ml. of 3 N hydrochloric acid and the resulting two layers are separated. The aqueous layer is extracted several times with portions of chloroform. The extracts are combined with the organic layer, dried, filtered and evaporated. The solid residue is recrystallized from a mixture of chloroform and petroleum ether to give 5-ethyl-5-phenylpyrrolidine-2,4-dione as a white solid, melting point 149°–150° C.

EXAMPLE 19

*Preparation of 5-ethyl-3-methyl-5-phenylpyrrolidine-2,4-dione*

A solution of 1 g. of 5-ethyl-5-phenylpyrrolidine-2,4-dione and 2 ml. of methyl iodide in 5 ml. of 1 N ethanolic sodium ethoxide is refluxed for 30 minutes and then evaporated to a sticky solid. Water and ethanol are added to the residue to give 0.8 g. of an orange colored solid. Recrystallization from ethanol gives 5-ethyl-3-methyl-5-phenylpyrrolidine-2,4-dione as a white solid, melting point 175°–178° C.

EXAMPLE 20

*Preparation of 3,5-diethyl-5-phenylpyrrolidine-2,4-dione and 4-ethoxy-5-ethyl-5-phenylpyrrolin-2-one*

A solution of 2 g. of 5-ethyl-5-phenylpyrrolidine-2,4-dione and 3 ml. of ethyl iodide in 10 ml. of 1 N ethanolic sodium ethoxide is refluxed for 4 hours and then evaporated to an oil. The oil is dissolved in chloroform and the resulting solution is extracted several times with dilute sodium hydroxide. Acidification of the alkaline extracts gives 0.6 g. of a solid which is recrystallized from aqueous ethanol to give 3,5-diethyl-5-phenylpyrrolidine-2,4-dione as a white solid, melting point 117°–118° C. (dec.).

The chloroform solution, after alkaline extraction, is dried and treated with petroleum ether to give 0.3 g. of 4-ethoxy-5-ethyl-5-phenylpyrrolin-2-one, which on recrystallization from chloroform petroleum ether mixture has a melting point of 153°–154° C.

EXAMPLE 21

*Preparation of 2-(p-tolyl)-2-(α-methylacetoacetamido)propionamide*

Following the procedure of Example 1 using 2-amino-2-(p-tolyl)propionamide in place of 2-amino-2-phenylpropionamide, the product 2-(p-tolyl)-2-(α-methylacetoacetamido)propionamide is obtained as a white solid which gives a deep green color with ferric chloride solution.

EXAMPLE 22

*Preparation of methyl 2-(p-tolyl)-2-(α-methylacetoacetamido)propionate*

Following the procedure in Example 2 using 2-(p-tolyl)-2-(α-methylacetoacetamido)propionamide in place of 2-phenyl-2-(α-methylacetoacetamido)propionamide the product, methyl 2-(p-tolyl)-2-(α-methylacetoacetamido)propionate is obtained as a white solid which gives a green color with ferric chloride solution.

EXAMPLE 23

*Preparation of 3,5-dimethyl-5-(p-tolyl)pyrrolidine-2,4-dione*

Following the procedure in Example 4 using methyl 2-(p-tolyl)-2-(α-methylacetoacetamido)propionate in place of methyl 2-phenyl-2-(α-methylacetoacetamido)propionate, the product 3,5-dimethyl-5-(p-tolyl)pyrrolidine-2,4-dione is obtained as a white solid.

EXAMPLE 24

*Hard gelatin capsules*

| | Gm. |
|---|---|
| 3,5 - diethyl - 3 - methyl - 5 - phenylpyrrolidine-2,4-dione | 200 |
| Cornstarch | 150 |
| Magnesium stearate, powder | 50 |
| Talc | 50 |

The finely powdered ingredients are mixed thoroughly and then encapsulated in 1000 two-piece hard gelatin capsules each containing 200 mgs. of 3,5-diethyl-3-methyl-5-phenylpyrrolidine-2,4-dione.

EXAMPLE 25

*Soft gelatin capsules*

One piece soft gelatin capsules for oral use each containing 250 mgs. of 3,5-diethyl-5-phenyl-pyrrolidine-2,4-dione are prepared by first dispersing the compound in sufficient corn oil to render the material capsulatable and then encapsulating in the usual manner.

EXAMPLE 26

*Tablets*

1000 tablets each containing 100 mgs. of 3,5-diethyl-3-methyl-5-phenylpyrrolidine-2,4-dione are prepared from the following ingredients:

| | Gm. |
|---|---|
| 3,5 - diethyl - 3 - methyl - 5 - phenylpyrrolidine-2,4-dione | 100 |
| Lactose | 50 |
| Starch | 50 |
| Calcium stearate | 10 |
| Talc | 10 |

The finely powdered ingredients are mixed thoroughly and then tableted by a slugging procedure.

EXAMPLE 27

Hard gelatin capsules

Five thousand two-piece hard gelatin capsules, each containing 400 mg. of 3,5-diethyl-5-phenyl-pyrrolidine-2,4-dione are prepared from the following ingredients:

|  | Gm. |
|---|---|
| 3,5-diethyl-5-phenylpyrrolidine-2,4-dione | 2000 |
| Lactose | 3000 |
| Magnesium stearate | 1000 |
| Talc | 1000 |

The finely powdered ingredients are mixed thoroughly and then encapsulated.

We claim:

1. A composition of matter having central nervous system depressant activity comprising an edible carrier and from 10 mgs. to about 1000 mgs. of a compound of the formula:

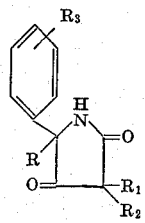

wherein $R$ and $R_1$ are lower alkyl and $R_2$ and $R_3$ are selected from the group consisting of hydrogen and lower alkyl.

2. A composition of matter having central nervous system depressant activity comprising an edible carrier and from 10 mg. to 1000 mg. of 3,5-diethyl-3-methyl-5-phenylpyrrolidine-2,4-dione ($\alpha$-isomer).

3. A composition of matter having central nervous system depressant activity comprising a pharmaceutical carrier and from 10 mgs. to about 1000 mgs. of 3,5-diethyl-3-methyl-5-phenylpyrrolidine-2,4-dione ($\beta$-isomer).

4. A composition of matter having central nervous system depressant activity comprising an edible carrier and from 10 mgs. to about 1000 mgs. of 3,5-diethyl-5-phenylpyrrolidine-2,4-dione.

5. A composition of matter having central nervous system depressant activity comprising an edible carrier and from 10 mgs. to about 1000 mgs. of 3,5-dimethyl-5-(p-tolyl)pyrrolidine-2,4-dione.

References Cited by the Examiner

UNITED STATES PATENTS 3,004,037  10/1961  Miller _____ 260—326.5

ALBERT T. MEYERS, *Primary Examiner.*

JULIAN S. LEVITT, *Examiner.*

STANLEY J. FRIEDMAN, *Assistant Examiner.*